March 24, 1959 L. F. RICE 2,879,145
FLUIDIZED CATALYST VESSELS USING SLOPING STANDPIPES
Filed Nov. 24, 1953
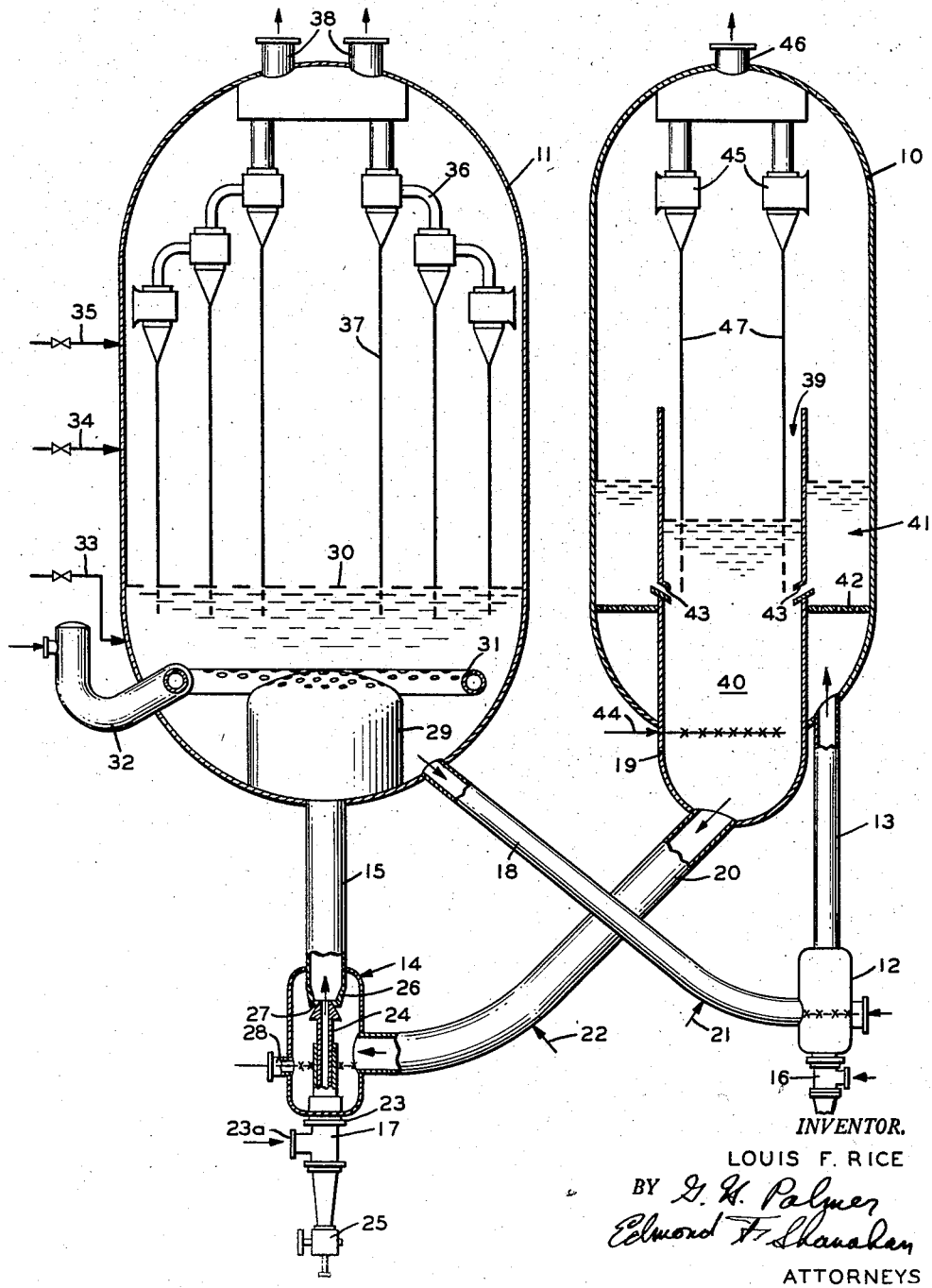
INVENTOR.
LOUIS F. RICE
BY *G. H. Palmer*
*Edmond F. Shanahan*
ATTORNEYS United States Patent Office 2,879,145
Patented Mar. 24, 1959

2,879,145

FLUIDIZED CATALYST VESSELS USING SLOPING STANDPIPES

Louis F. Rice, Ridgewood, N.J., assignor to The M. W. Kellogg Company, Jersey City, N.J., a corporation of Delaware Application November 24, 1953, Serial No. 394,125

5 Claims. (Cl. 23—288)

This invention relates generally to apparatus for carrying out petroleum cracking in the presence of powdered catalyst, or similar processes. The apparatus is used for a process in which powdered catalyst is aerated by the gases of the process so that it behaves in a liquid-like manner and can thus be caused to flow around a cycle including a reaction vessel, a stripping vessel, and a regeneration vessel.

More particularly, the invention is a catalytic conversion apparatus in which a combination reaction and stripping vessel is supported at substantially the same elevation as a regeneration vessel, and catalyst discharges from each of the vessels through an inclined standpipe to a feed chamber under the opposite vessel, and catalyst is fed substantially vertically upward into said opposite vessel from said feed chamber under control of a vertically reciprocable valve seating in the lower end of said vertical line, and in which said vertical line is aerated by means of a reaction vapor introduced through the hollow stem of the valve.

One of the primary objects of the present invention is to provide an apparatus in which there is a minimum amount of erosion, and in which, if erosion does occur it will be occurring in a feed chamber separate and apart from the major vessels.

The second object is to provide an apparatus in which the over-all height of the vessels and accompanying equipment is relatively low for given capacity. Vessels of the type to which this invention relates are generally of very great weight and sometimes extend upwardly 200 or 300 feet in the air. Under some conditions it is important to minimize vertical height; for example, where prevalence of earthquakes adds greatly to the cost of tall structures, or where the apparatus is to be located near an airport.

Still another object of the invention is to eliminate piping bends, etc., in order to avoid erosion and loss of pressure head.

Still another object is to provide a precise control over flow from one vessel to the other, said control being located within said feed chamber in order to be independent of both vessels and piping.

These objects are accomplished by withdrawing catalyst in oblique standpipes, instead of the more usual vertical ones, and discharging catalyst from said oblique standpipes into feed chambers in which the control valves are mounted. The carrier lines from said feed chambers are vertical lines discharging directly upward into the respective vessels.

Specific embodiment of the invention is shown in the accompanying drawing in which a reaction vessel 10 and a regeneration vessel 11 are supported side by side.

Reaction vessel 10 is supplied with catalyst from a feed chamber 12 located under it by means of a vertical up-flowing carrier line 13. Similarly regeneration vessel 11 is supplied from a regenerator feed chamber 14 located under the said regenerator and communicating with it by a vertical up-flowing carrier line 15. Feed vessels 12 and 14 are provided at their lower ends with vertically reciprocable plug valves 16 and 17, which seat in the lower ends of up-flow carrier lines 13 and 15 respectively as seen in the partly vertical cross section view of regenerator feed chamber 14, as will be described in detail hereinafter. The reactor feed chamber 12 is supplied with regenerated catalyst from the bottom of regenerator 11 by way of an obliquely sloping standpipe 18 and regenerator feed chamber 14 supplied with spent catalyst withdrawn from a central stripper well 19 mounted in reactor 10 by way of an oblique standpipe 20. Standpipes 18 and 20 may be provided with aeration nozzles such as those indicated at 21 and 22 respectively.

Important features of the preferred form of the invention are control valves 16 and 17. Since these are substantially identical to one another, differing only in that 16 is used for the introduction of reactant vapor and control of regenerated catalyst, while valve 17 is used for the introduction of regeneration gases and control of spent catalyst, only the interior workings of the valve 17 will be described. Valve 17 is comprised of a housing 23 mounted vertically in the lower end of regenerator feed chamber 14, a hollow stem plug 24 vertically reciprocable within housing 23, and a plug positioning motor 25 by means of which plug 24 may be vertically positioned as desired. Plug 24 seats against seat 26, which comprises of the lower end of up-flow carrier line 15. Under operating conditions, valve 24 is slightly withdrawn downwards to provide an annular passage 27 of controllable horizontal cross section; it is through this annular passage that spent catalyst must pass on its way to the regenerator. Transportation of spent catalyst in dilute phase upwardly through line 15 is accomplished mostly by regenerating gas (usually air) entering line 15 from the hollow stem of plug 24. Said regenerating gas is introduced by valve housing 17 at 23a and finds its way through passages in the housing into the interior of hollow stem plug 24. The interior of regenerator feed chamber 14 is aerated with steam introduced by way of line 28.

Dilute suspension of spent catalyst in regenerating gas and some steam enters the lower end of regenerator 11 through line 15, which discharges into the interior of a cylindrical distributor 29. The dilute suspension escapes from distributor 29 and into the large, dense mass of catalyst 30 undergoing regeneration, numerous holes being provided in the dome shaped upper end of distributor 29 for this purpose. Additional regenerating gas is also introduced into the lower part of regenerator dense phase 30 by means of a hollow annular ring 31 having many openings in its upper surface, said ring being supplied with gas by means of pipe 32.

The upper surface of regenerator dense phase 30 is maintained at a suitable level within regenerator 11 by detecting said level with instrument taps 33 and 35, and adding catalyst when necessary. Spray 34 is used to limit the regenerator temperatures by introducing cooling water when necessary. Regenerator dense phase 30 is maintained in a dense turbulent mass throughout which the component particles circulate, fluidized by the velocity of the gases flowing up through the dense phase mass. Mass 30 must behave in the manner of a liquid with a boiling upper surface. Above dense phase mass 30, most of regenerator 11 is filled with dilute phase of much lower density. Flue gas escapes from regenerator 11 through a series of cyclone separators 36, which separate and return suspended particles to regenerator dense phase 30 by way of dip-legs 37. The flue gas escapes from stacks 38.

The interior of reactor 10 is campartmented by a cylindrical stripping vessel 19, vertically positioned so as to provide a central stripping well 39 containing a dense fluidized mass of catalyst 40 undergoing stripping; and a reaction dense phase mass 41, disposed in an annular space around central stripping well 19 and supported on a grid 42. Reaction dense phase 41 continuously discharged catalyst into stripping dense phase 40 through louvre slots 43. These slots are horizontally extended and provided with baffling to reduce fluidization in their immediate vicinity and to minimize cross-over of stripping and reaction gases. The baffle is at an oblique angle slightly greater than the angle of repose of the powdered catalyst in order to prevent plugging.

As in the case of regenerator dense phase 30, reaction dense phase 41, and stripping dense phase 40 are maintained in dense turbulent fluidized state by the upward passage of reaction gases and stripping gases respectively. The reaction gases enter from beneath grid 42, being introduced into the lower part of reactor 10 by up-flow carrier line 13. Stripping dense phase 40 is fluidized by introduction of stripping gas through distributor 44.

Above reaction dense phase 41 and stripping dense phase 40, the interior of reactor 10 is filled with a dilute phase of much lower density containing particles supported in reaction effluent and stripping gas. These gases or vapors are removed through cyclone separators 45 to line 46 which carries them to a recovery system not shown. Recovered particles are deposited in the stripping phase 40 at a level below that of louvres 43 by means of dip-legs 47. Alternately, the recovered particles may be similarly returned to the reaction dense phase 41.

The upper level of reaction dense phase 41 is maintained at a desired elevation by regulating valve 13, instrument taps similar to those described in connection with regenerator 11 being employed. The temperature of reaction dense phase 41 is controlled by regulating the flow of material through valve 16.

A typical example of conditions is as follows:

|  | Reactor | Regenerator |
| --- | --- | --- |
| Bed Temperature, ° F | 925 | 1,100 |
| Bed Density, #/c. ft | 35 | 30 |
| Dilute Phase Density, #/c. ft | 0.2 | 0.4 |
| Dilute Phase Temperature, ° F | 925 | 1,080 |
| Dilute Phase Gas Velocity, ft./s | 1.70 | 2.21 |
| Draw-Off Standpipes: |  |  |
| Temperature, ° F | 925 | 1,100 |
| Density, #/c. ft | 30 | 30 |
| Gas Velocity, ft./s | 5.0 | 4.9 |
| Upflow Inlet Lines: |  |  |
| Temperature, ° F | 950 | 940 |
| Density, #/c. ft | 4.35 | 3.47 |
| Gas Velocity, ft./s | 40.0 | 41.1 |

The stripped catalyst was drawn from stripper 19 through line 20 and may accumulate within distributor 29 to an intermediate density of about 25 pounds per cubic foot.

In a 40,000 barrels per stream day fluid catalytic cracking unit, as much as 30,000 to 50,000 pounds per hour of stripping steam may be required to adequately strip spent catalyst in stripping vessel 40.

I claim:

1. An apparatus comprising in combination a vertical elongated reaction vessel, a separate vertical elongated regeneration vessel positioned horizontally adjacent to said reaction vessel, an elongated stripping chamber situated within the lower portion of said reaction vessel and arranged to provide an annular chamber therewith, the upper end of said stripping chamber being in open communication with the upper portion of said reaction vessel, a perforated grid means positioned within the lower portion of said annular chamber to divide the same into an upper chamber and a lower chamber, means for transferring finely divided contact material from said upper chamber to said stripping chamber, a first transfer conduit sloping obliquely downward from the lower portion of said stripping chamber and in open communication therewith, a first feed chamber means communicated with the first transfer conduit at a point below the regeneration chamber, a first substantially vertical upflow transfer conduit having its lower end in open communication with the first feed chamber means and its upper end in open communication with the lower portion of said regeneration vessel, a first hollow stem plug valve means arranged to regulate the flow of finely divided solid contact material into the lower end of said first upflow conduit for passage to said regeneration vessel, a second transfer conduit sloping obliquely downward from the lower portion of said regeneration vessel and in open communication therewith, a second feed chamber means positioned below the annular chamber and in open communication with the second transfer conduit, a second substantially vertical upflow conduit having its lower end in open communication with the second feed chamber means and its upper end in open communication with said lower chamber, a second hollow stem plug valve means arranged to regulate the flow of materials into the lower end of said second upflow conduit for passage to said lower chamber, means for withdrawing reaction products from the upper portion of said reaction vessel and means for withdrawing gaseous material from the upper portion of said regeneration vessel.

2. An apparatus comprising in combination a vertical cylindrical reaction vessel, a separate vertical cylindrical regenerator vessel positioned horizontally adjacent to said reactor vessel, a substantially cylindrical stripping chamber concentrically positioned within the lower portion of said reactor vessel thereby providing an annular chamber within the lower portion of said reactor vessel, the upper end of said stripping chamber being in open communication with the upper portion of said annular chamber, a perforated grid positioned within the lower portion of said annular chamber and arranged to divide the same into an upper annular chamber and a lower annular chamber, said stripping chamber provided with at least one slot in the wall thereof positioned above said grid, a first transfer conduit sloping obliquely downwardly from the lower portion of said stripper chamber and in open communication therewith, a first feed chamber connected to the lower end of said first transfer conduit and positioned below said regenerator vessel, a first substantially vertical upflow conduit having its lower and upper ends in open communication with said first feed chamber and the lower portion of said regenerator vessel respectively, a first vertical reciprocal hollow stem plug valve positioned within said first feed chamber and arranged to seat in the lower end of said first upflow conduit, a second transfer conduit sloping obliquely downwardly from the regenerator vessel and in open communication with the lower portion thereof, a second feed chamber positioned below said reactor vessel and in open communication with said second transfer conduit, a second substantially vertical upflow conduit having its lower and upper ends in open communication with the second feed chamber and the aforesaid lower annular chamber respectively, and a second vertical reciprocal hollow stem plug valve positioned within said second feed chamber and arranged to seat in the lower end of said second upflow conduit.

3. The apparatus of claim 2 which is further characterized by having a distributor chamber containing a plurality of openings in the upper surface thereof in open communication with the upper end of said first vertical upflow conduit and supported on the bottom of said regeneration vessel, a hollow annular distributor ring containing a plurality of openings in its upper surface circumscribing said distributor means, and conduit means connecting the outside of said vessel with said hollow annular distributor ring.

4. An apparatus for handling finely divided solid contact material comprising in combination a vertically elongated reaction vessel, a separate vertically elongated regeneration vessel positioned horizontally adjacent to said reaction vessel, an elongated cylindrical stripping chamber concentrically positioned within and extending downwardly through the bottom of said reaction vessel forming an annular zone with said reaction vessel, said stripping chamber being in open communication in the upper portion thereof with the upper portion of said annular chamber, an annular perforated grid positioned within the lower portion of said annular chamber, openings in said stripping chamber walls for transferring finely divided solid contact material from said annular chamber to said stripping chamber above said grid, a first obliquely downwardly sloping conduit connected to the lower portion of said stripping chamber extending downwardly to a first chamber means positioned substantially vertically below said regeneration vessel, a first substantially vertical conduit connected to the upper portion of said first chamber means and the lower portion of said regeneration vessel, a first hollow stem valve means positioned within said first chamber means adapted to pass finely divided contact material from said chamber means upwardly through said vertical conduit to the lower portion of said regeneration vessel, a second obliquely downwardly sloping conduit connected to the lower portion of said regeneration vessel and a second chamber means positioned substantially vertically below said reaction vessel, a second substantially vertical conduit connected to the upper portion of said second chamber means and the lower portion of said annular chamber in said reaction vessel, a second hollow stem plug valve means positioned within said second chamber means adapted to pass finely divided contact material from said second chamber means upwardly through said vertical conduit to the lower portion of said annular chamber, means for maintaining a dense fluidized bed of finely divided contact material in said reaction vessel, means for removing reaction products from the upper portion of said reaction vessel, means for maintaining a dense fluidized bed of finely divided contact material in said regeneration vessel and means for removing regeneration gases from the upper portion of said regeneration vessel.

5. An apparatus for contacting a gaseous fluid with a continuously renewed bed of finely divided solid material in fluidized condition, which comprises in combination a substantially vertically deposed cylindrical reaction vessel and a separate substantially vertically deposed cylindrical regeneration vessel positioned horizontally adjacent to said reaction vessel, a stripping chamber concentrically positioned within said reaction vessel to form an annular reaction chamber about said stripping chamber, said stripping chamber and said annular chamber in open communication with one another in the upper portion thereof, said annular chamber divided in the lower portion by an annular perforated grid contiguous with the wall of said stripping chamber and the wall of said reaction vessel, means for transferring finely divided contact material from the annular reaction chamber to the stripping chamber, a first substantially vertical conduit extending downwardly from the lower portion of said annular chamber, a first obliquely downwardly sloping conduit connecting the lower portion of said regeneration vessel with the lower portion of said first vertical conduit, a second substantially vertical conduit extending downwardly from the lower portion of said regeneration vessel, a second obliquely downwardly sloping conduit connecting the lower portion of said stripping zone with the lower portion of said second vertical conduit, means for adding a gaseous fluid to the lower portion of each of said substantially vertical conduits to convey finely divided solid material upwardly therethrough, means for adding stripping gas to said stripping chamber, means for adding regeneration gas to the lower portion of said regeneration zone and means for removing gaseous fluid from the upper portion of each of said vessels.

References Cited in the file of this patent
UNITED STATES PATENTS

| | | |
|---|---|---|
| 2,394,814 | Snuggs | Feb. 12, 1946 |
| 2,428,873 | Gunness et al. | Oct. 14, 1947 |
| 2,446,247 | Scheineman | Aug. 3, 1948 |
| 2,487,961 | Angell | Nov. 15, 1949 |
| 2,488,030 | Scheineman | Nov. 15, 1949 |
| 2,518,693 | Jahnig | Aug. 15, 1950 |
| 2,589,124 | Packie | Mar. 11, 1952 |
| 2,612,437 | Kaulakis et al. | Sept. 30, 1952 |
| 2,629,653 | Barr | Feb. 24, 1953 |
| 2,668,755 | Kershaw et al. | Feb. 9, 1954 |
| 2,684,931 | Berg | July 27, 1954 |
| 2,700,641 | Rehbein | Jan. 25, 1955 |